United States Patent [19]

May et al.

[11] Patent Number: 4,836,465
[45] Date of Patent: Jun. 6, 1989

[54] MAGNETIC TAPE TRANSPORT SYSTEM

[75] Inventors: Richard L. May, Manhattan Beach; Kenneth J. Curran, Thousand Oaks, both of Calif.

[73] Assignee: Cal R&D, Inc., Culver City, Calif.

[21] Appl. No.: 149,422

[22] Filed: Jan. 29, 1988

[51] Int. Cl.⁴ .................... G11B 15/26; G11B 23/087
[52] U.S. Cl. ................................. 242/192; 242/198; 242/200; 242/201; 242/206; 360/96.4
[58] Field of Search ................. 242/198–201, 242/192, 206, 208; 360/96, 96.3, 96.4, 132

[56] References Cited

U.S. PATENT DOCUMENTS

| | | | |
|---|---|---|---|
| 3,758,048 | 9/1973 | Sugaya et al. | 242/198 X |
| 3,851,840 | 12/1974 | Bastiaans | 242/198 |
| 4,059,245 | 11/1977 | Hirose | 242/201 |
| 4,252,284 | 2/1981 | Suzuki | 242/201 |
| 4,358,800 | 11/1982 | Shimizu et al. | 242/201 X |
| 4,698,706 | 10/1987 | Kilstofte | 360/96.4 |

Primary Examiner—David Werner
Attorney, Agent, or Firm—Price, Gess & Ubell

[57] ABSTRACT

A compact magnetic tape transport system employing a novel interchangeable tape cartridge and tape drive unit is described. All modes of transport, including forward, fast forward, rewind and pause are accomplished by simply controlling the speed and direction of rotation of a single motor. All access for reading and transporting the tape is provided at the peripheral edges of the tape cartridge. A protective door is automatically placed about the peripheral edges of the tape cartridge upon its removal from the tape drive unit.

3 Claims, 5 Drawing Sheets

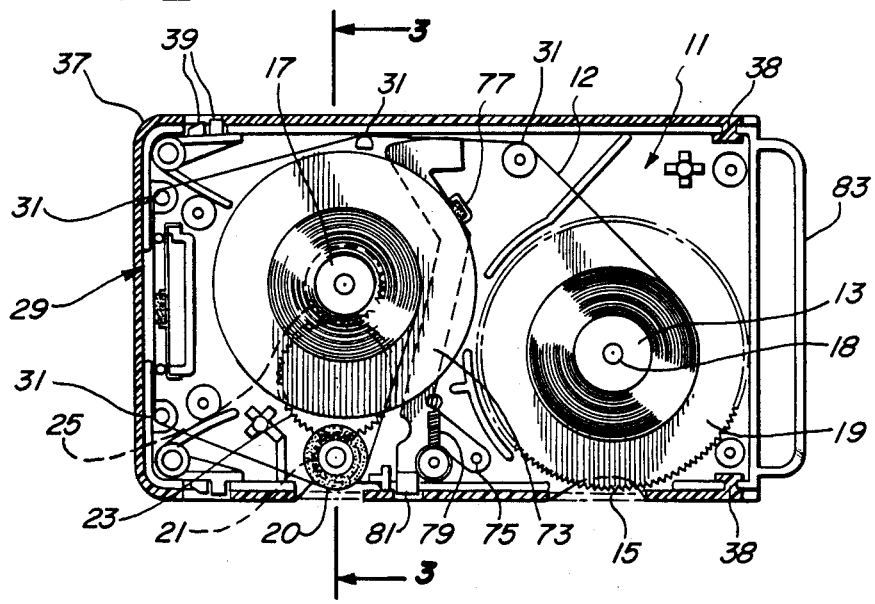
FIG. 2
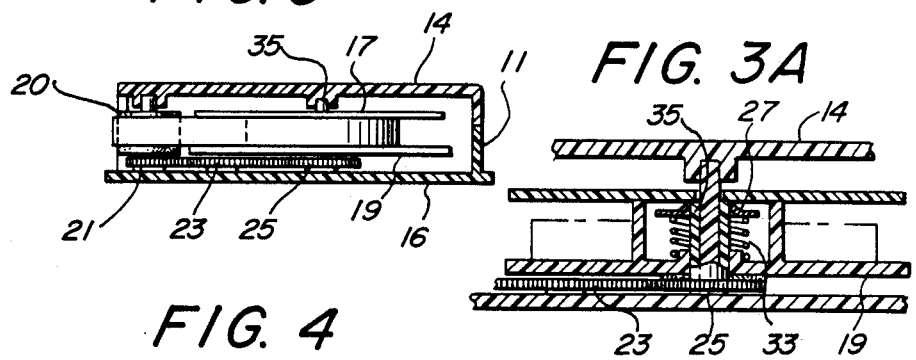
FIG. 3
FIG. 3A
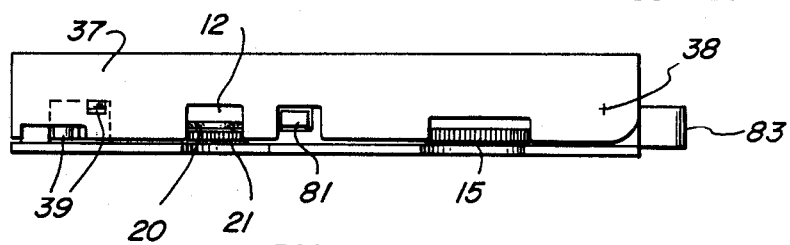
FIG. 4
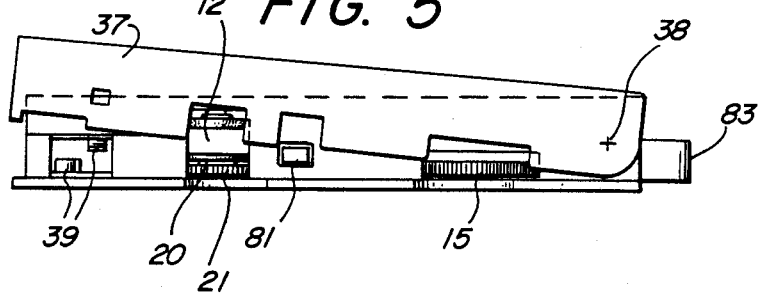
FIG. 5

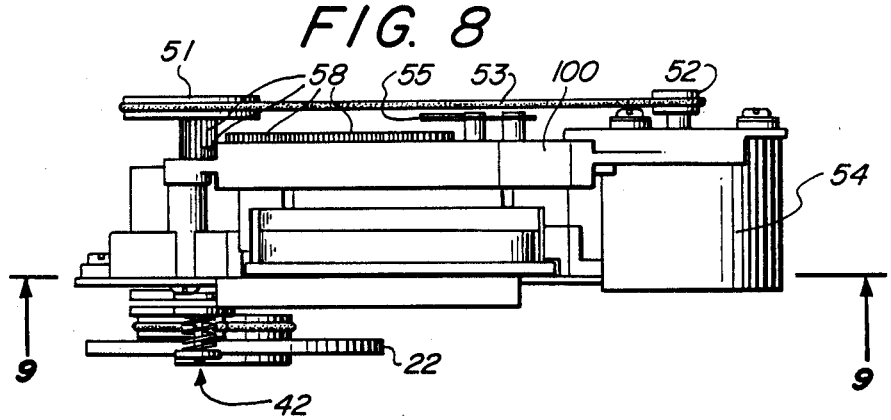
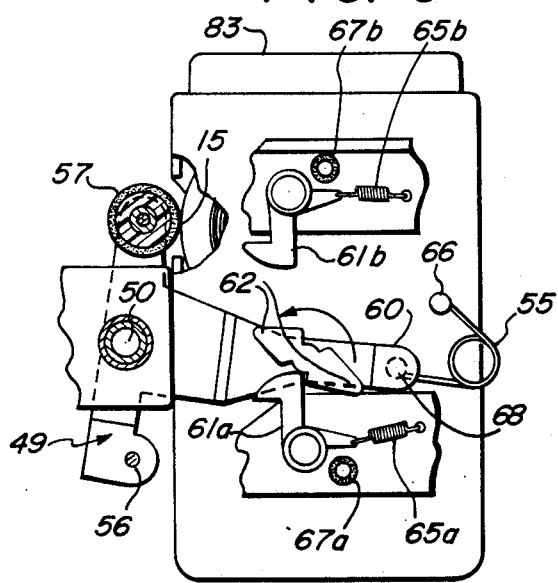
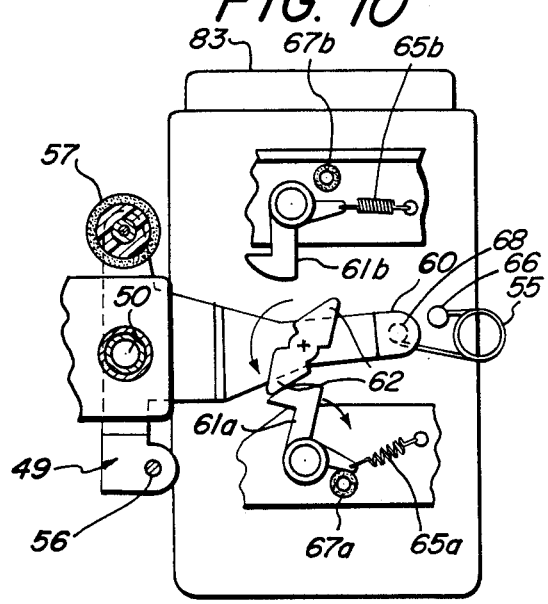
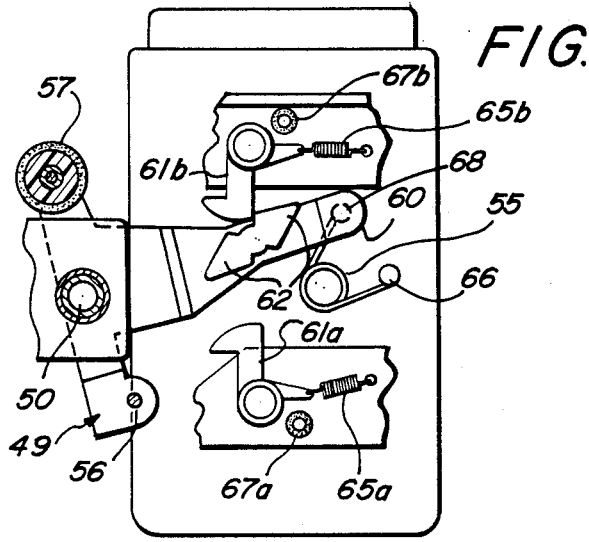
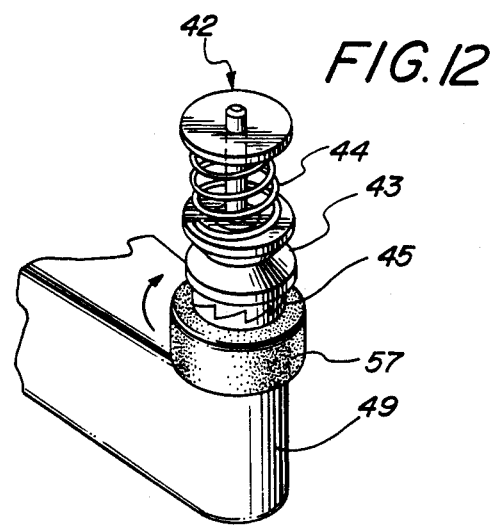

4,836,465

MAGNETIC TAPE TRANSPORT SYSTEM

BACKGROUND OF THE INVENTION

1. Field of the Invention

The present invention relates generally to improvements in compact magnetic tape transport systems, and more particularly pertains to a new and improved combination employing a novel interchangeable tape cartridge and tape player that can, for example, be incorporated within a doll's interior.

2. Description of the Prior Art

In the field of compact magnetic tape transport systems, it has been the prevalent practice to employ interchangeable tape cassettes in combination with a tape drive unit capable of receiving such cassettes and transporting the tape contained therein across a tape head located within the tape drive unit. Such cassettes contain two reels; magnetic tape stored on one reel is unwound therefrom, drawn across the tape head, and wound on to the second reel. Upon insertion of the cassette and typically after activation of the tape drive unit, a pinch roller and capstan located within the tape drive unit engage a portion of the magnetic tape at a location in between the two reels. The magnetic tape is sandwiched between the pinch roller and the capstan. Subsequent rotation of the pinch roller causes transport of the tape. A separate drive hub engages the center of each reel of the cassette. Rotation of these drive hubs serves the function of rewinding and fast-forwarding the tape, and in addition, takes up any slack as the tape is driven across the tape head by the pinch roller capstan combination. Typically, the coordinated movement of a multitude of arms, levers and solenoids is required to initially engage the magnetic tape within the cassette and to then switch between the various transport modes. The complexity of this operation adds expense to such devices which may be prohibitive in various applications. A multitude of moving and interacting parts adds the further disadvantage of making the device susceptible to breakdown or failure which may again be an extremely important factor in various applications. Another disadvantage of the prior art is that a segment of magnetic tape remains exposed upon extraction of the cassette from the tape transport unit. Such exposure may invite tampering or allow a section of the tape to be otherwise damaged.

These inherent disadvantages of the prior art become particularly cumbersome when the magnetic tape transport system is to be incorporated in a toy such as a doll. It is most important in such an application that the magnetic tape transport system's cost, size and susceptibility to failure in the hands of a child are minimized.

SUMMARY OF THE INVENTION

It is therefore an object of this invention to provide a compact magnetic tape transport system utilizing a minimum of moving and interacting parts in which the speed and direction of rotation of a single motor controls and drives all functions of the tape drive unit.

It is a further object of the present invention that the device easily lends itself to relatively robust, "childproof" construction so that its susceptibility to damage and failure are minimized.

Another object of the invention is to provide an interchangeable magnetic tape cartridge in which no magnetic tape remains exposed upon extraction from the tape drive unit.

According to the present invention, the foregoing and other objects are attained by the magnetic tape cartridge and magnetic tape drive unit of the present invention. The system employs an interchangeable tape cartridge wherein all accesses necessary for reading, as well as transporting, the magnetic tape therein are arranged around its peripheral edges. A protective door is provided that is automatically moved to its closed position upon extraction from the tape drive unit to cover magnetic tape that would otherwise remain exposed. With the door in its closed position, the tape cartridge presents a relatively smooth and tamper-proof package ideally suited for handling by a child. The tape drive unit has a simplified structure in which all transport functions of the tape drive are controlled by the voltage supplied to the single drive motor. A mechanism automatically and mechanically translates a particular direction of rotation of the motor to the appropriate rotational engagement of an inserted tape cartridge. The tape cartridge's access arrangement allows for a simplified transport mechanism which, in combination with the very basic control requirements, minimizes the number of interacting parts. Besides reducing the cost of manufacture, the simplicity of the tape unit's design lends itself to a robust and compact construction which is both easily accommodated within a doll's interior and able to resist the predictably rough treatment as a child's plaything.

BRIEF DESCRIPTION OF THE DRAWINGS

FIG. 2 is a top plan view of the magnetic tape cartridge of the present invention;

FIGS. 3 and 3A are cross-sectional views of FIG. 2;

FIG. 4 is a side view of the tape cartridge with the protective door in its closed position;

FIG. 5 is a side view of the tape cartridge with the protective door in its opened position;

FIG. 8 is an elevated side view of the tape drive unit;

FIGS. 9, 10 and 11 show a switching sequence of the tape drive unit as viewed from below;

FIG. 12 illustrates the ratchet mechanism; and

DETAILED DESCRIPTION OF THE PREFERRED EMBODIMENTS

The following description is provided to enable any person skilled in the tape transport system field to make and use the present invention, and sets forth the best modes contemplated by the inventor of carrying out his invention. Various modifications, however, will remain readily apparent to those skilled in the art, since the generic principles of the present invention have been defined herein specifically to provide an improved compact magnetic tape transport system.

Figure 1:
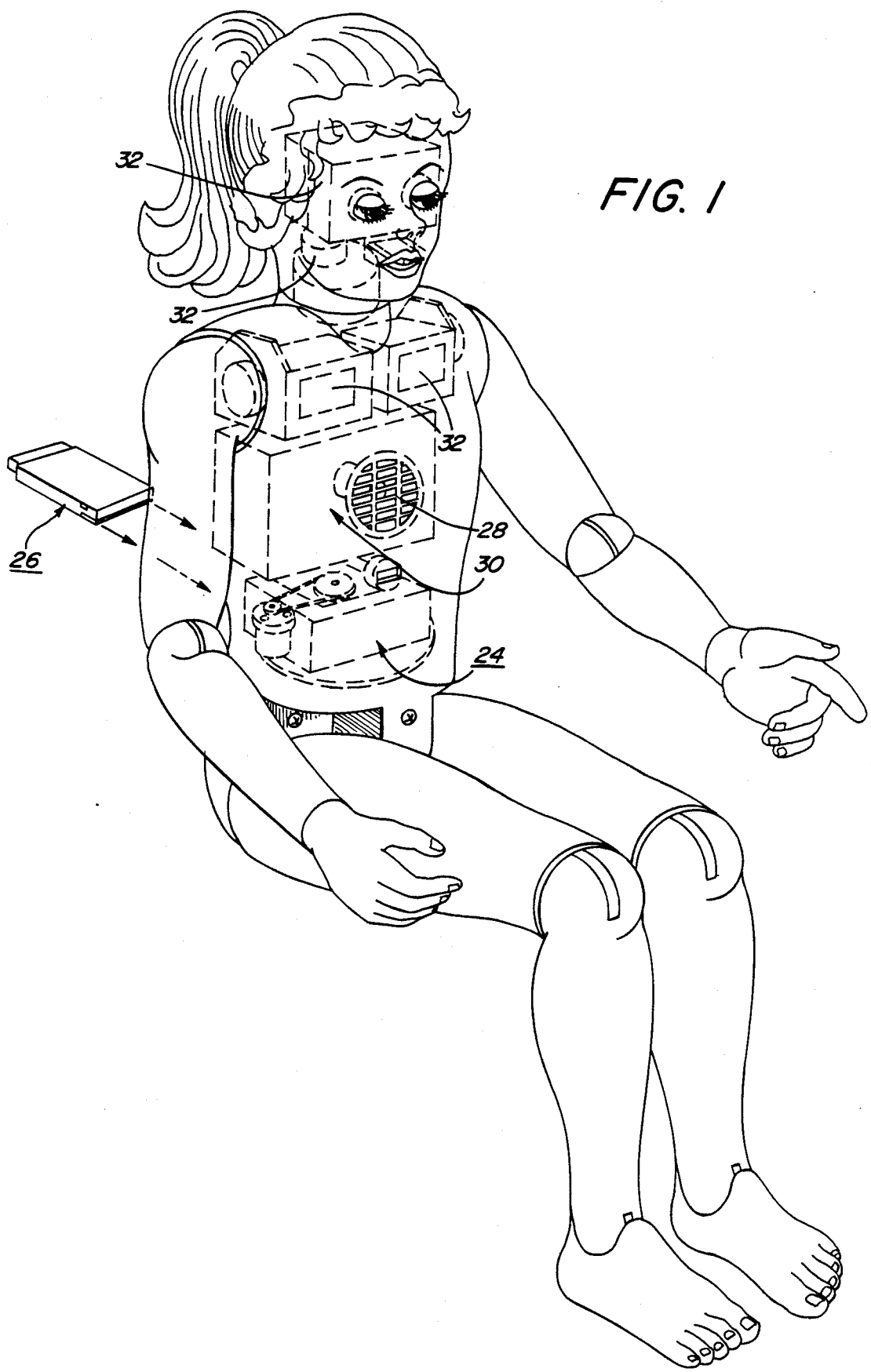
FIG. 1 is a perspective view of the tape transport system located within a doll.

FIG. 1 illustrates an animated doll incorporating the magnetic tape transport system of the present invention. The tape drive unit 24 is located within the body of the doll. Access is provided in its back for the insertion of the interchangeable tape cartridges 26. A speaker 28 is mounted in the doll's chest to project any emanating sounds in a forward direction. Clothing fitted to cover the doll's exterior would effectively hide these components. Information contained on the magnetic tape includes a sound track as well as signals to control and coordinate various movements of the doll. A processor 30 interprets the signals contained on the tape and causes the servo motors 32 powering movement of the arms, neck and head to operate in a controlled and coordinated manner. Simply inserting a tape cartridge into the tape drive unit activates the mechanism within. The doll can, for example, speak or sing to a sound track in coordination with various body and facial movements to impart a lifelike effect.

FIG. 2 illustrates in detail the magnetic tape drive cartridge of the present invention. The unique design of this tape drive cartridge requires the use of the complementary tape drive unit described below. The cartridge of FIG. 2 comprises a housing 11 within which the various components are located. Magnetic tape 12 wound around supply reel 13, is guided along a path within the housing by a plurality of guide pins 31 past opening 29, around capstan 20 and on to a take-up reel 17.

In distinction to conventional systems, neither reel is accessible near its central axis of rotation. The top surface 14, as well as the bottom surface 16, of the housing are completely sealed and do not provide access to any of the mechanism within. All the necessary openings are disposed around the peripheral edges of the cartridge. Opening 29 allows access by a tape head to the magnetic tape. The supply reel 13 is positioned such that a portion of its edge 15 extends to the edge of the housing through another opening. This configuration allows direct rotational engagement of the supply reel by the tape drive unit during, for example, the rewind mode by simply urging a drive roller against edge 15. Both supply reel and take-up reel design require the incorporation of at least one lower disk member 19 in conjunction with the central hub 18. In the case of the supply reel, the disk serves the purpose of extending the reel to the edge of the housing, while in the case of the take-up reel, the disk serves the purpose of preventing the magnetic tape from encountering the gear train assembly. This minimum requirement can be complemented by the addition of a second disk disposed in a parallel and concentric position near the top of hub 18, as shown in FIG. 3. The incorporation of this additional feature serves to alleviate any unwanted friction of the edges of the wound-up tape against the top of the housing 14. Another opening in the cartridge is provided at the edge closest to the capstan 20. Rotational engagement of the capstan causes the magnetic tape to be drawn across opening 29.

It is, of course, important that the magnetic tape be drawn across the tape head at a constant rate. Resort to the use of a capstan/pinch roller combination is in line with conventional wisdom as direct rotation of the reels to achieve a constant linear speed would be much too cumbersome due to variation in the effective diameter of the reels as tape is wound up thereon. Departure from the conventional is inherent in the fact that the capstan is located within the cartridge instead of the tape drive unit and that rotation of the capstan not only serves to draw the tape across the tape head but serves the additional function of directly driving the take-up reel 17. In this preferred embodiment, a gear train, designated as 21, 23 and 25, mechanically links the rotation of the capstan with the rotation of the reel. The capstan comprises a small diameter roller having a rubberized surface to provide a good "traction" surface when a rotating pinch roller is urged against it.

In order to compensate for the variation of the effective diameter of the reel, a friction coupling is provided within the hub 18 of reel 17. As tape is fed onto the reel at a constant linear rate, the reel must rotate at a progressively slower angular rate as the amount of the wound up tape thereon increases the effective diameter of the reel. This is achieved by selecting gear ratios in the gear train such that a rate of rotation necessary to accommodate the linear feed rate of the oncoming tape when the reel has its smallest effective diameter, i.e., when no tape is wound-up thereon, is transferred from the capstan to the reel. As this effective diameter increases and the speed by which the spool is driven exceeds that which is necessary to take up any slack of the oncoming tape, tension builds which is released by slippage within the mechanism illustrated in FIG. 3A. Rotation of gear 25 is transferred to the cap 27, which are both rigidly affixed to hollow shaft 35. The reel 17, while concentrically located by shaft 35, is not rigidly mounted thereon such that rotation of the shaft 35 is not directly transferred to reel 17. Instead, rotation is transferred by spring 33 which is compressed in between cap 27 and reel 17. Neither end of the spring is directly affixed to the cap or the reel and it is therefore solely the friction produced by the pressure of the spring against cap and reel that enables transfer of rotation. When rotation of 27 is greater than that which is required to take up the slack of the oncoming tape, the tension in the tape overcomes the friction of the spring against the cap and reel and causes the coupling to slip.

During the rewind mode, the supply reel 13 is driven in a clockwise (as pictured in FIG. 2) direction of rotation. Commensurate movement of tape across the capstan 20 causes rotation of the capstan, which rotation is transferred to reel 17 via the gear train 21, 23, 25 and friction coupling within the hub of the take-up reel. The transferred angular speed of reel 17 produces a linear speed which would be much higher than necessary and since no tension in the tape builds in this direction of rotation to slow rotation of the reel, the tape would be expelled from reel 17 at a higher rate than could be taken up by reel 13. In order to prevent excess tape from being spilled into the interior of the housing, the rate of rotation of reel 17 is slowed by function of a brake mechanism. The brake mechanism comprises a brake lever 73 which pivots at 75 and urges a friction pad 77 against reel 17. A coil spring 79 provides the necessary bias for the brake action. When the tape drive unit is operating in a forward mode, a contacting surface within the tape drive unit causes the end of the arm 81 to be pushed inwardly thereby releasing contact at 77. Conversely, in the rewind mode, the end of the arm 81 is not contacted thereby allowing the brake mechanism to exert a drag against the take-up reel's rotation and thereby causing the friction coupling to slip.

Figure 13:
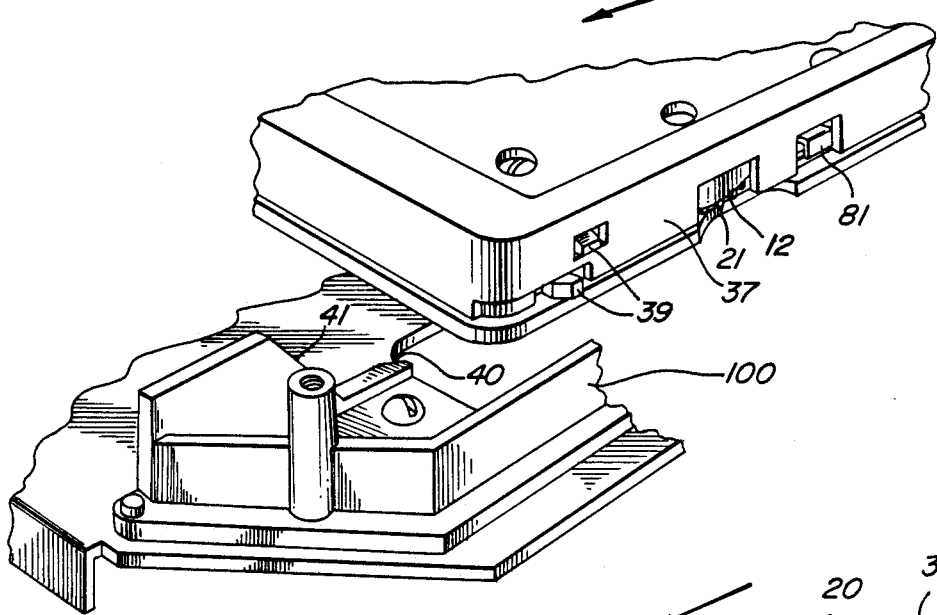
FIGS. 13, 14 and 15 show a perspective view of a tape cartridge being inserted into the tape drive unit.
Figure 14:
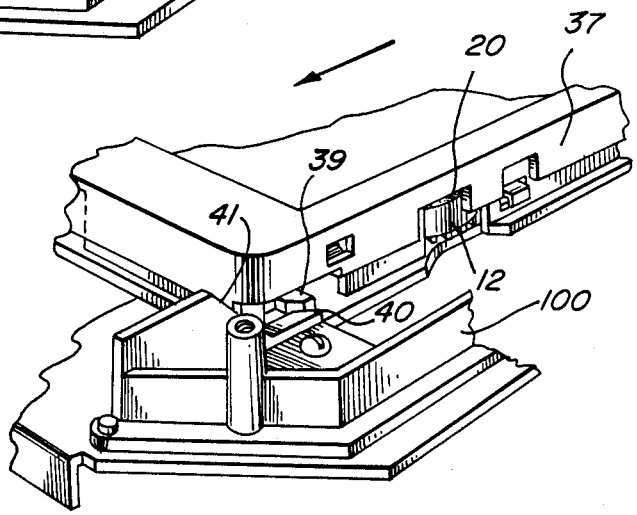
Figure 15:
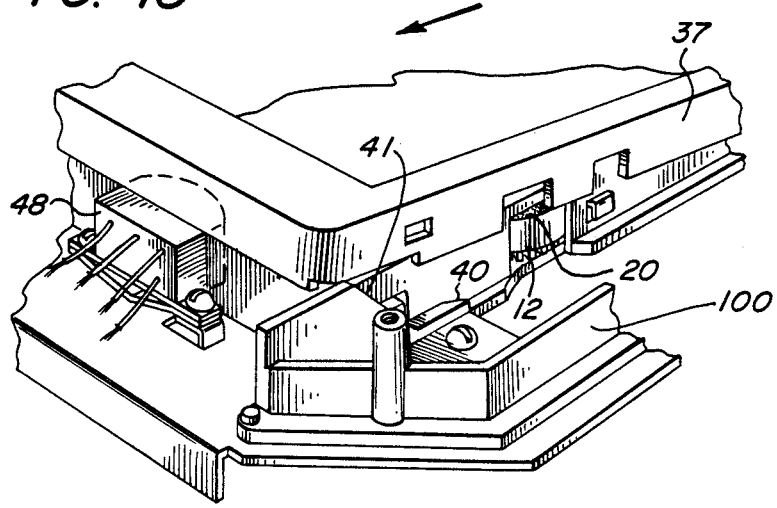

Another feature of the tape cartridge of this invention includes the addition of a protective door disposed about the peripheral edges of the magnetic tape cartridge and is hinged at 38. FIG. 4 illustrates the protective door in its closed position. The protective door 37 extends around three edges of the cartridge and is hinged at 38. The tape normally exposed to the outside as it goes over capstan 20 or across the opening 29 is thereby protected. FIGS. 13, 14 and 15 illustrate how, when the tape cartridge is inserted into the tape drive unit, the latch 39 is depressed by a raised edge 40 in the drive unit's chassis 100, allowing door 37 to be ramped upwardly at 41 as it is pushed further and further into the unit. Once completely inserted in the tape drive unit, the tape head 48 has unhindered access to the magnetic tape as it is drawn across at 29. The capstan 20 is completely exposed to allow engagement of the pinch roller and the peripheral section of reel 13 at 15 is exposed to allow engagement for rewind. As the cartridge is extracted from the tape drive unit, the cover 37 is forced downwardly, again by a ramping action, against the chassis 100 (not shown) to close the cover and engage the spring-loaded latch 39. A handle 83, in the form of a protrusion from the housing is disposed on the end opposite the opening 29 to enable a firm grasp when extracting the cartridge from the tape drive unit.

A unique tape drive design is, of course, necessary to accommodate the dimensions and features of the above-described magnetic tape cartridge. A receiving slot 99 in the tape drive unit chassis 100 receives the tape cartridge oriented along its longitudinal axis. A tape head 48 is located in the far end opposite the slot. Complete insertion of the cartridge places it in a position where the magnetic tape is up against the tape head 48 at 29 of the tape cartridge and also closes microswitch 97, which initiates a programmed drive sequence. As previously described, this insertion procedure automatically causes the unlatching and lifting of the cover 37. Protrusions within the tape drive unit trip the latch 39 as the cartridge passes by and another set of protrusions within the tape drive unit serve to ramp the cover upwardly as the cartridge is further inserted.

Figure 6:
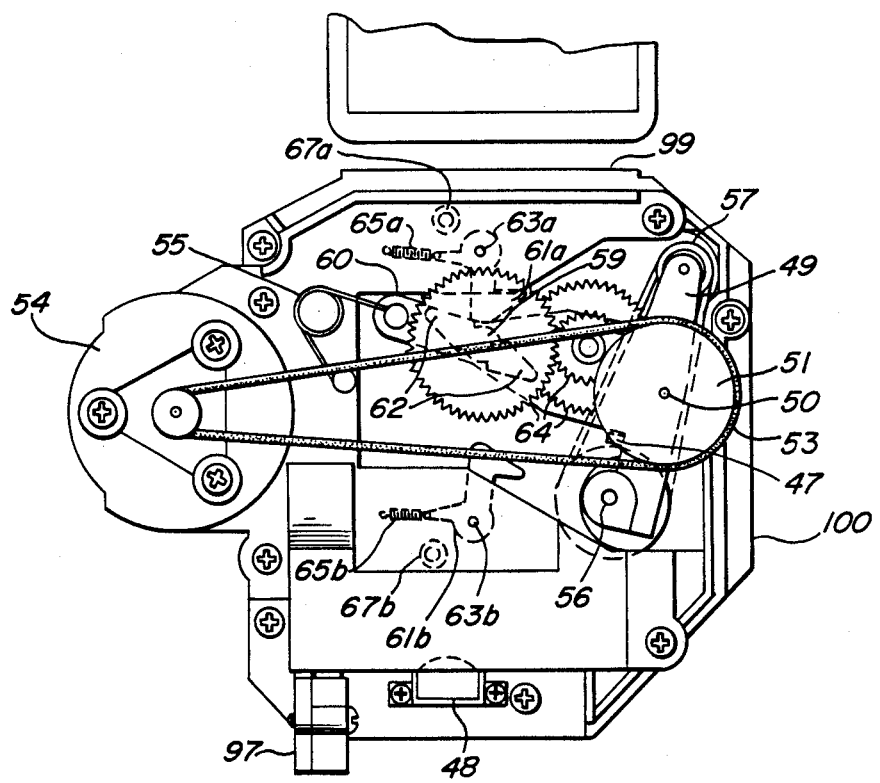
FIG. 6 is a top plan view of the tape drive unit of the present invention.
Figure 7:
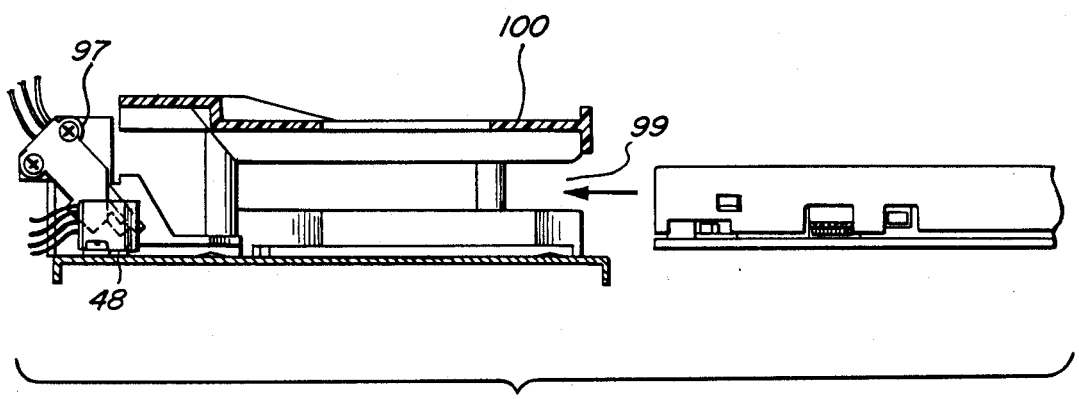
FIG. 7 is an elevated side view of the tape drive unit receiving a tape cartridge.

The complete drive transfer mechanism of the tape drive unit as shown in FIG. 6 is located on an arm 49 which is pivotably mounted at 50. The described configuration of the tape cartridge requires a rotating member to be simply urged against either the capstan 20 or the edge 15 of reel 13 to transport the tape in either direction. To that end a pinch roller 56 is disposed at one end of the arm while a drive roller 57 is disposed at the opposite end. The pivot point 50 is located such that when the arm is oriented in a first position, the pinch roller 56 engages the capstan 20 of the tape cartridge and when the arm is pivoted to the second position, the drive roller 57 engages the peripheral projection 15 of the supply reel. A single spring 55 in compression between the perpendicular projection 60 of the arm 49 and the chassis 100 provides the necessary bias to urge the arm against the tape cartridge in either position.

The pinch roller 56 comprises a rotatable, hardsurfaced, small diameter pin which when urged against the rubberized surface of the capstan 20 transfers rotation. The magnetic tape sandwiched in between the pinch roller of the drive unit and the capstan within the tape cartridge is thereby positively transported. The arm near the pinch roller is shaped such that when the pinch roller is positioned to engage the capstan, in other words, when the unit is in a forward mode, a protrusion 48 in the arm deactivates the brake mechanism by pushing on the lever 73 at 81.

The drive roller 57 comprises a rotatable cylindrical member which when urged against the supply reel transfers rotation. A rubberized surface similar to that of the capstan of the tape cartridge enables transfer of rotation to a smooth supply reel. Alternatively, a toothed drive roller engaging a toothed supply reel provides a more positive transfer of rotation.

Both the pinch roller and the drive roller are driven from a centrally disposed central drive pulley 51 via separate belt and pulley arrangements. The system of pulleys is arranged such that the effective reduction ratio to the pinch roller imparts the linear speed necessary for a proper playback of the tape. The reduction ratio of the pulleys to the drive roller is such that it can be driven at a significantly higher speed to enable rewind of the tape in short order. Both pinch roller 56 and drive roller 57 continue rotating regardless of which position the arm 49 is in. A flywheel 22 (FIG. 8) attached to an extension of the pinch roller 56 serves to smooth out any fluctuations in the rate of rotation to ensure a constant linear tape speed.

The central drive pulley 51, which is driven from pulley 52 via belt 53, is located such that its axis of rotation is the same as the pivot axis 50. This ensures that the pulley's position does not change relative to the chassis 100 as the arm 49 is pivoted from the first position to the second position. The pulley is rotated via a drive belt 53 and pulley 52 driven by an electric motor 54. The relative size of the pulleys causes an initial reduction in the rotational speed while the use of a belt and pulley arrangement provides a simple safety feature which allows slippage should an impairment of movement occur in the mechanism.

The direction of rotation of the motor and hence the direction of rotation of pulley 52 and central drive pulley 51 determines which position the pivoting arm assumes. Rotation of pulley 51 is transferred to selection member 59 via gear train 64. The selection member comprises two arms 62 radially arranged about its central axis of rotation. This, in conjunction with the two flippers 61 mounted on the chassis, functions as a modified ratchet mechanism. Each flipper is free to pivot around 63 while a centered position is maintained by the action of spring 65. Rotation of selection member in a clockwise direction, as pictured in FIGS. 9, 10 and 11), is not resisted by the flipper member 61a as its position is simply deflected each time an arm 62 of the selection member 59 passes by. In this position, the motor turns the drive roller 57, which in turn rewinds the tape within the tape cartridge. If, however, the motor is reversed (arrow), the rotation of the selection member 59 is reversed and a counterclockwise rotation will cause an arm 62 of the selection member to engage the flipper 61a. The flipper's deflection in this direction is limited by the flipper stop 67a. This causes the rotation of the selection member to lever the complete drive transfer mechanism arm 49 and 60 to which it is attached, towards its second position, as illustrated in FIG. 10. Continued rotation in a counterclockwise direction in its second position, FIG. 11, is not resisted by the flipper 61b as a reversal of the location of the flipper stop allows the flipper to be deflected. The spring 65b serves to relocate the flipper in its middle position after the selection member passes by. Conversely, if the rotation of the motor is again reversed, the selection member engages the flipper 61b whose deflection is limited by flipper stop 67b. The drive member is then again urged into its other position. The pivot points 66 and 68 on the chassis 100 and arm extension 60 are positioned to allow the single spring 55 to supply the necessary bias in both positions, as is apparent in the sequence illustrated in FIGS. 9, 10 and 11.

A unique feature of this invention thereby becomes apparent as control of the single drive motor controls and drives all functions of the tape transport mechanism. A forward/play, fast forward, pause/stop and rewind mode can be selected by simply controlling the voltage supplied to the motor. Zero voltage stops the motor for the pause or stop mode. A given voltage would drive the motor and hence pinch roller in forward direction for the forward/play mode; increasing the voltage would fast forward the tape, while a reversal of polarity would initiate the switching sequence and cause the tape to rewind.

A mechanism is provided which prevents the supply reel from being rotated in the wrong direction during the interim period when the motor's direction of rotation has been reversed but the sequence of FIGS. 9, 10 and 11 has not yet been completed. Rotation of the supply reel in the wrong direction would cause tape to be spilled off the reel into the interior of the housing. A ratchet coupling 42 attached to the base of drive roller 57 fulfills this function. The coupling is shown in detail in FIG. 12. A drive belt (not shown) drives pulley 43, which is urged against drive roller 57 by spring 44. Both pulley 43 and the drive roller 57 have an intermeshing toothed configuration 45 at their interface. The profile of the teeth is such that rotation is transferred in only one direction (arrow), in which the vertical side of one tooth pushes against the vertical side of the next tooth. Rotation in the opposite direction, however, causes the two angled sections of the teeth to interact so that the pulley is simply urged away from the drive roller. The force of the spring 44 is sufficient to ensure proper interaction of the tooth surfaces regardless of the orientation of the entire structure.

It should be understood, of course, the foregoing disclosure relates only to a preferred embodiment of the invention and that numerous modifications may be made therein without departing from the spirit and scope of the invention as set forth in the appended claims.

What is claimed is:

1. A magnetic tape drive unit capable of transporting tape between a supply reel and a take-up reel over a capstan, all contained within a tape cartridge, comprising:
   a chassis having a chamber capable of receiving a tape cartridge;
   a bidirectional drive means;
   a drive transfer member pivotably mounted to the chassis;
   a pinch roller for engaging a capstan within the tape cartridge, rotatably mounted on one end of the drive transfer member;
   a drive roller for engaging a projecting edge of a supply reel within the tape cartridge, rotatably mounted to the other end of the drive transfer member;
   a biasing means for biasing the drive transfer member to a first position in which the pinch roller engages the capstan or to a second position in which the drive roller engages the edge of the supply reel;
   a switching means for alternatively positioning the drive transfer member in the first or the second position;
   means for rotationally linking the drive means with the pinch roller; and
   means for rotationally linking the drive means with the drive roller.

2. The magnetic tape drive unit of claim 1 in which the switching means comprises:
   an extension member attached to the drive transfer member radially extending out from its pivot point;
   a rotatable selection member having two radially projecting arms;
   means for rotationally linking the drive means with the selection member;
   a first ratchet mechanism limiting rotation of the selection member attached to the chassis to one direction when the drive transfer member is in its first position; and
   a second ratchet mechanism attached to the chassis limiting rotation of the selection member to the other direction when the drive transfer member is in its second position,
   whereby rotation of the selection member in a direction opposite that allowed by the ratchet mechanism causes the drive transfer member to be levered to the other position.

3. The magnetic tape drive unit of claim 2 wherein the ratchet mechanism comprises:
   a first flipper pivotably mounted on the chassis in proximity to the rotatable selection member when the drive transfer member is in its first position;
   a first biasing means which biases the first flipper so as to extend into the path of the rotating selection member arms when the drive transfer member is in its first position;
   a first flipper stop which prevents the movement of the flipper in a second direction;
   a second flipper pivotably mounted on the chassis in proximity to the rotatable selection member when the drive transfer member is in its second position;
   a second biasing means which biases the second flipper so as to extend into the path of the rotating selection member arms when the drive transfer mechanism is in its second position; and
   a second flipper stop which prevents the movement of the flipper in a first direction,
   whereby rotation of the selection member in a first direction when the drive transfer member is in the first position is unimpeded while when the direction of rotation is reversed in the first position, the selection member arm engages the first flipper which is prevented from moving by the first flipper stop and thereby forces the drive transfer member to pivot to its second position.

* * * * *